United States Patent Office 2,939,868
Patented June 7, 1960

2,939,868

D-TRANS AND DL-TRANS-5-METHYL-4-AMINO-3-ISOXAZOLIDONE AND A PROCESS OF PREPARING 4-AMINO-3-ISOXAZOLIDONES

Balthasar Hegedus, Basel, Switzerland, assignor to Hoffman-La Roche Inc., Nutley, N.J., a corporation of New Jersey No Drawing. Filed Dec. 11, 1956, Ser. No. 627,547

Claims priority, application Switzerland June 28, 1955

3 Claims. (Cl. 260—307)

This invention relates to the production of 4-amino-3-isoxazolidones. More particularly, this invention relates to the production of 4-amino-3-isoxazolidone and 4-amino-3-isoxazolidones substituted in the 5-position with a lower alkyl, phenyl or mono substituted phenyl group. The 4-amino-3-isoxazolidone and 5-substituted-4-amino-3-isoxazolidones are produced according to this invention from α-amino-β-hydroxy acid derivatives corresponding to the general formula

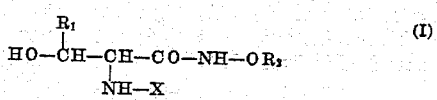

wherein $R_1$ represents hydrogen, lower alkyl, phenyl or monosubstituted phenyl, $R_2$ represents hydrogen, aralkyl or monosubstituted aralkyl and X represents a group readily split off by hydrogenolysis.

The compound corresponding to Formula I above is esterified with an inorganic or organic acid and the ester thus obtained is subjected to hydrogenolysis. The hydroxamic acid formed as a result of the hydrogenolysis is cyclized with a basic agent to obtain a 4-amino-3-isoxazolidone.

Lower alkyl groups represented by $R_1$ in the above formula include methyl, ethyl, propyl, etc. Monosubstituted phenyl groups represented by $R_1$ include nuclearly substituted phenyl groups such as p-nitrophenyl etc. Aralkyl groups represented by $R_2$ include the benzyl group and monosubstituted benzyl groups, e.g. p-nitrobenzyl. Substituents represented by X which are readily split off by hydrogenolysis include the carbobenzyloxy group, carballyloxy group and the like, that is to say, carbo-lower alkoxy groups, carbo-lower alkenoxy groups and carboaralkoxy groups. "Aralkyl" as used herein refers to monocyclic aralkyl groups wherein the "alkyl" is a lower alkylene radical. As noted above, the aralkyl groups may bear a substituent on the phenyl ring. The 5-substituent of the final product corresponds to the $R_1$ of the starting material as defined above.

Describing the process in detail, as a first step a starting material corresponding to Formula I above is esterified on the β-hydroxy group with an inorganic or organic acid compound. Esterification agents which may be used in the reaction include halogenated aromatic sulfonic acids, for example, p-toluenesulfonyl chloride, halogenated alkanesulfonic acids, for example, methanesulfonyl chloride and the like. Additional esterification agents include halogenated lower fatty acids such as trifluoracetic acid and hydrohalic acids such as hydrochloric acid or hydrobromic acid. The esterification reaction is preferably effected in the presence of a tertiary base, for example pyridine, a tri-lower alkylamine such a triethylamine or an N-lower alkylmorpholine such as N-ethylmorpholine. The reaction may be carried out in an inert solvent such as chloroform or benzene or the tertiary base referred to above may serve as the solvent.

The ester obtained in the first reaction step is next subjected to hydrogenolysis. For example, the ester is treated with catalytically activated hydrogen, preferably in the presence of a catalyst such as the noble metals, e.g. platinum, palladium, etc. An alternative method for effecting the hydrogenolysis comprises the use of alkali in liquid ammonia. For example, the ester described above is dissolved in liquid ammonia and sodium metal is introduced until a lasting blue color is obtained. The ester obtained in the first reaction step is thereby converted into the free α-amino-hydroxamic acid.

As a last step in the process, the free hydroxamic acid obtained in the second step of the process is treated with a basic cyclizing agent to effect ring closure. The product of this reaction is a 4-amino-3-isoxazolidone wherein the 5-position is unsubstituted or substituted depending on the nature of $R_1$ of the starting material corresponding to Formula I above. The basic agents which may be used to convert the α-amino-hydroxamic acid into a 4-amino-3-isoxazolidone are alkali metal-lower alkyl alcoholates, for example sodium methylate, sodium ethylate, potassium methylate, potassium ethylate, inorganic alkaline agents such as alkali metal hydroxides or alkali metal carbonates, organic bases such as the nitrogen heterocyclics pyridine or piperidine or basic ion exchange resins. The ring closure reaction is preferably carried out in alcoholic or aqueous solution.

It is not necessary to isolate the hydroxamic acid compound prior to effecting ring closure. For example, after hydrogenolysis by means of alkali in the presence of ammonia, the ammonia may be evaporated and water is added whereby the alkali hydroxide formed effects ring closure to the 4-amino-3-isoxazolidone.

The last two steps of the reaction, namely the hydrogenolysis and the ring closure with the basic agent, may be combined in one reaction step in that the hydrogenolysis is accomplished in the presence of the basic agent. In this manner the 4-amino-3-isoxazolidone compound is obtained directly from the ester produced in the initial esterification step of the process.

One preferred modification of the invention comprises esterifying the starting material with an inorganic acid and dissolving the ester thus obtained in alcohol. Alkali metal alcoholate is added to the alcohol solution and the material is hydrogenated in the presence of a noble metal catalyst until no more hydrogen is absorbed. At the completion of the hydrogenation the catalyst and the alkali metal salt of the acid used for the esterification are separated by filtration. The 4-amino-3-isoxazolidone is obtained in pure form from the filtrate by absorption on an ion exchange resin and subsequent elution therefrom, e.g. by means of dilute ammonia. A preferred starting material for the process of this invention comprises an α-amino-β-hydroxy acid derivative corresponding to Formula I above wherein $R_1$ represents hydrogen, $R_2$ represents benzyl and X represents carbobenzyloxy. The product obtained from the foregoing starting material is 4-amino-3-isoxazolidone.

The 4-amino-3-isoxazolidone and the 5-substituted analogs thereof are white crystalline compounds which are readily soluble in water and practically insoluble in organic solvents. These compounds are useful as antibacterial agents, e.g. in treating infections caused by organisms such as pneumococci, *E. coli*, *S. schottmuelleri* and *M. tuberculosis*. In addition, certain members of the class, especially 5-lower alkyl-4-amino-3-isoxazolidone and 5-methyl-4-amino-3-isoxazolidone in particular, possess sedative activity and may be used, for example, as tranquillizers. The substances may be administered orally in therapeutic doses in conventional vehicles.

The starting materials corresponding to Formula I above are produced as follows. An α-amino-β-hydroxy acid having the formula

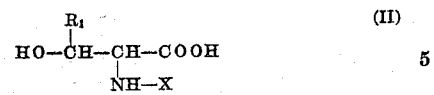

$$HO-\overset{R_1}{\underset{NH-X}{CH}}-CH-COOH \qquad (II)$$

wherein $R_1$ and X have the same significance defined above is treated with hydroxylamine or an O-ether of hydroxylamine, e.g. the O-benzyl ether of hydroxylamine, in the presence of an agent which effects the splitting off of a molecule of water, e.g. N,N'-dicyclohexyl-carbodiimide. The reaction is preferably carried out in an inert solvent, for example, tetrahydrofuran, dimethylformamide, dioxane, etc., while cooling. The N,N'-dicyclohexyl-urea which is formed in the reaction is filtered off, the solvent is evaporated from the filtrate and the compound having the Formula I above is obtained as residue.

Compounds utilized in this invention occur in optically active isomeric forms and racemic mixtures thereof. This invention may be applied to and encompasses within its scope all such embodiments.

*Example 1*

41 parts by weight of DL-1-(N-carbobenzyloxyamino)-2-hydroxypropionic acid and 21 parts by weight of O-benzylhydroxylamine were dissolved in 300 parts by volume of tetrahydrofuran. While cooling with ice and stirring, a solution of 36 parts by weight of N,N'-dicyclohexyl-carbodiimide in 50 parts by volume of tetrahydrofuran were dropped in within 10–15 minutes. The mixture was stirred for 3 hours without additional cooling. The N,N'-dicyclohexylurea formed was filtered under suction and the solvent was evaporated from the filtrate in vacuo. The reaction product was obtained as a crystalline residue. After recrystallization from methanol, the 1 - (N - carbobenzyloxyamino) - 2 - hydroxypropionohydroxamic acid-O-benzyl ether, melted at 107–109° C.

63 parts by weight of 1-(N-carbobenzyloxyamino)-2-hydroxypropionohydroxamic acid-O-benzyl ether were dissolved in 300 parts by volume of pyridine and, while cooling with ice water, the solution was treated portionwise with 36 parts by weight of p-toluenesulfonyl chloride. The mixture was permitted to stand in the refrigerator overnight, then poured into 3 liters of 3 N sulfuric acid and extracted with methylene chloride.

The methylene chloride solution was washed several times with dilute sulfuric acid and sodium bicarbonate solution, dried over sodium sulfate and concentrated in vacuo. The residual oil was dissolved in 120 parts by volume of warm absolute ethanol and the solution was treated with petroleum ether until slightly turbid, whereupon the 1-(N-carbobenzyloxyamino)-2-(p-toluenesulfonyloxy)-propionohydroxamic acid-O-benzyl ether crystallized. After recrystallization from ethanol and petroleum ether, the product melted at 103–106° C.

5 parts by weight of the product obtained above were suspended in 300 parts by volume of ethanol and hydrogenated in the presence of palladium metal. After the absorption of 2 mols of hydrogen, the hydrogenation slowed down considerably. The catalyst was separated by filtration, the filtrate was evaporated to small volume in vacuo and a solution of 0.9 part by weight of sodium methylate in 20 parts by volume of ethanol were added. Sodium p-toluenesulfonate precipitated at once. The mixture was warmed 5 to 10 minutes on a steam bath and filtered under suction. The filtrate was evaporated in vacuo and the residue was dissolved in water. By passing the solution through a cation exchange column (Amberlite IR–120, a polystyrene nuclear sulfonic acid resin, produced as described in U.S. Patent No. 2,366,007, commercially available from Rohm and Haas Co., Philadelphia, Pa.), the 4-amino-3-isoxazolidone was absorbed and then eluted with 0.2 N ammonia solution. The solution was evaporated to small volume, adjusted to pH 5 to 6 with dilute acetic acid and precipitated with isopropanol. The 4-amino-3-isoxazolidone was thus obtained in pure form, M.P. 130–135° C. (with dec.).

*Example 2*

5 parts by weight of 1-(N-carbobenzyloxyamino)-2-(p-toluenesulfonyloxy)-propionohydroxamic acid-O-benzyl ether (obtained as described in Example 1) and 0.9 part by weight of sodium methylate were dissolved in 300 parts by volume of ethanol and hydrogenated in the presence of palladium metal. At the completion of the hydrogenation, the catalyst and sodium p-toluenesulfonate were separated by filtration and the filtrate was concentrated in vacuo. The residue, 4-amino-3-isoxazolidone, was dissolved in water and isolated by means of Amberlite IR–120 ion exchange resin as described in Example 1.

*Example 3*

5 parts by weight of 1-(N-carbobenzyloxyamino)-2-(p-toluenesulfonyloxy)-propionohydroxamic acid-O-benzyl ether (obtained as described in Example 1) were dissolved in 300 parts by volume of liquid ammonia. Into this solution there were introduced, while stirring, small pieces of sodium metal until the appearance of a persistent blue color. The ammonia was evaporated off, the residue was dissolved in water, the oily contaminants were separated by agitating with ether and the 4-amino-3-isoxazolidone was isolated from the water solution as described in Example 1.

*Example 4*

100 parts by weight of DL-1-(N-carbobenzyloxyamino) - 2-(p-toluenesulfonyloxy)-propionohydroxamic acid-O-benzyl ether (obtained as described in Example 1) were suspended in a mixture of 2,000 parts by volume of ethanol and 40 parts by volume of 48% hydrobromic acid. After the addition of 3 parts by weight of palladium black, the mixture was hydrogenated. At the completion of the hydrogenation, the catalyst was separated by filtration and the mixture was concentrated in vacuo to about 1400 parts by volume.

Into the solution thus obtained there was introduced a strong stream of dry ammonia for about 20 minutes at 20° and for 5 minutes at 30–35°. There appeared temporarily a thick white precipitate which dissolved. The solution thus obtained was concentrated in vacuo at a bath temperature of 30–35° to about 900 to 1000 parts by volume and thereupon diluted with 5000 parts by volume of distilled water. The 4-amino-3-isoxazolidone produced was absorbed on a cation exchange column (Amberlite IR–120). The column was eluted with 0.2 N ammonia solution, the solvent was evaporated in vacuo to small volume, the pH was adjusted to 5 to 6 with dilute acetic acid and the 4-amino-3-isoxazolidone was precipitated with alcohol, M.P. 130–135° C.

*Example 5*

46.1 parts by weight of DL-threo-1-(carbobenzyloxyamino)-2-hydroxybutyric acid (a viscous light yellow oil produced by the carbobenzyloxylation of 1-amino-2-hydroxy butyric acid, e.g. with carbobenzyloxy chloride, in solution made alkaline with soda) and 22.4 parts by weight of O-benzylhydroxylamine were dissolved in 150 parts by volume of tetrahydrofuran. While stirring and cooling with ice, 37.7 parts by weight of N,N'-dicyclohexyl-carbodiimide dissolved in a little tetrahydrofuran were dropped into the solution. After all the diimide had been dropped in, the mixture was stirred for another 2–3 hours at room temperature, the N,N'-dicyclohexylurea formed was filtered off under suction and the filtrate was evaporated to dryness in vacuo. The residual oil was dissolved in 200–300 parts by volume of ether and cooled in ice water. The DL-threo-1-(N-carbobenzyloxyamino)-2-hydroxybutyrohydroxamic acid-O-benzyl ether produced soon began to separate as a gelatinous mass. The mixture was permitted to stand overnight in the refrigerator, lfitered under suction and purified by crystallization from 250 parts by volume of toluene. The product melted at 92–95° C.

66 parts by weight of DL-threo-1-(N-carbobenzyloxyamino)-2-hydroxy-butyrohydroxamic acid-O-benzyl ether were dissolved in 250 parts by volume of absolute pyridine. A small amount of undissolved material was filtered off and the filtrate was treated portionwise with 14 parts by volume of methanesulfonyl chloride while cooling with ice. The mixture was permitted to stand overnight in the refrigerator, poured into 2 liters of ice water, acidified with sulfuric acid and agitated with about 1500 parts by volume of methylene chloride. The methylene chloride solution was washed with sodium bicarbonate solution saturated with 3 N sulfuric acid and with water, dried over sodium sulfate and concentrated to about 400 parts by volume. The mixture was cooled with ice whereupon a first fraction of DL-threo-1-(N-carbobenzyloxyamino) - 2 - (methylsulfonyloxy)-butyrohydroxamic acid-O-benzyl ether was filtered off under suction. An additional fraction having a melting point of 115–116° C. was obtained from the mother liquor.

39 parts by weight of the DL-threo-1-(N-carbobenzyloxyamino) - 2 - (methylsulfonyloxy)-butyrohydroxamic acid-O-benzyl ether obtained above were suspended in a mixture of 2200 parts by volume of ethanol and 16 parts by volume of 48% hydrobromic acid. After the addition of 2 parts by weight of palladium black, the mixture was hydrogenated. After the completion of the hydrogenation, the catalyst was filtered off and the filtrate was worked up as described in Example 4. The DL-trans-5-methyl-4-amino-3-isoxazolidone obtained had no definite melting point and decomposed between 160–170° C.; paper chromatography: Schleicher-Schüll paper No. 2043b, solvent: isopropanol-conc. $NH_4OH$–$H_2O$, 80:2:18, $R_f$=0.27, identification with ninhydrin; U.V. absorption: $\lambda_{max}$=224 m$\mu$, E=4200, in water.

This application is a continuation-in-part of my co-pending application Serial No. 593,034, filed June 22, 1956, now abandoned.

I claim:
1. DL-trans-5-methyl-4-amino-3-isoxazolidone.
2. D-trans-5-methyl-4-amino-3-isoxazolidone.
3. A process which comprises cyclizing a compound of the formula

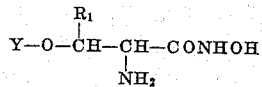

wherein $R_1$ represents a member of the group consisting of hydrogen, lower alkyl, phenyl and nitrophenyl, and Y represents the acid radical of arylsulfonic acid as a blocking group, by reacting said compound with a basic cyclizing agent.

References Cited in the file of this patent

UNITED STATES PATENTS

| | | |
|---|---|---|
| 2,772,280 | Peck | Nov. 27, 1956 |
| 2,772,281 | Holly et al. | Nov. 27, 1956 |
| 2,815,348 | Runge | Dec. 3, 1957 |
| 2,862,020 | Hegedus | Nov. 25, 1958 |

OTHER REFERENCES

Karrer: Organic Chemistry (Elsevier, 4th Eng. ed.) pp, 102–107 (1950).

Adkins: Reactions of Hydrogen, pp. 112–3 (1937).

Anson et al.: Advances in Protein Chemistry, vol. 5, pp. 29–31 (1949).

Kuehl et al: J. Am. Chem. Soc., vol. 77, pp. 2344–47 (1955).